United States Patent
Katano et al.

(10) Patent No.: US 8,645,587 B2
(45) Date of Patent: Feb. 4, 2014

(54) CONNECTION APPARATUS, PROCESSING METHOD FOR CONNECTION APPARATUS AND COMPUTER-READABLE RECORDING MEDIUM IN WHICH PROCESSING PROGRAM IS RECORDED

(75) Inventors: Atsushi Katano, Adachi (JP); Atsuhiro Otaka, Kawasaki (JP); Nobuyuki Honjo, Tama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/616,745

(22) Filed: Sep. 14, 2012

(65) Prior Publication Data

US 2013/0166788 A1 Jun. 27, 2013

(30) Foreign Application Priority Data

Dec. 27, 2011 (JP) ................................. 2011-285715

(51) Int. Cl.
*G06F 3/00* (2006.01)
*G06F 11/00* (2006.01)

(52) U.S. Cl.
USPC ................................................ 710/15; 714/3

(58) Field of Classification Search
USPC ..................... 710/15–19; 714/48, 3
See application file for complete search history.

(56) References Cited

U.S. PATENT DOCUMENTS

| 6,446,134 | B1 * | 9/2002 | Nakamura | 719/313 |
|---|---|---|---|---|
| 7,263,593 | B2 * | 8/2007 | Honda et al. | 711/205 |
| 7,650,532 | B2 * | 1/2010 | Fukui | 714/47.1 |
| 8,104,031 | B2 * | 1/2012 | Kai | 717/168 |
| 2006/0107098 | A1 * | 5/2006 | Maki et al. | 714/6 |
| 2009/0063719 | A1 * | 3/2009 | Honjo et al. | 710/8 |
| 2010/0251244 | A1 * | 9/2010 | Fukui | 718/100 |
| 2011/0185226 | A1 * | 7/2011 | Douchi et al. | 714/6.22 |
| 2011/0289501 | A1 * | 11/2011 | Yamasaki et al. | 718/1 |

FOREIGN PATENT DOCUMENTS

| JP | 2006-279347 | 10/2006 |
|---|---|---|
| JP | 2009-540436 | 11/2009 |
| WO | WO-2007146515 | 12/2007 |

* cited by examiner

*Primary Examiner* — Christopher Shin
(74) *Attorney, Agent, or Firm* — Fujitsu Patent Center

(57) ABSTRACT

A connection apparatus interposed between a storage device including at least one storage section and a plurality of controllers for controlling the storage device, the connection apparatus includes a notification section that transfers, when a notification indicating occurrence of a state variation relating to the storage section is received from the storage device, the notification to at least one of the controllers, a monitoring section that monitors access from the at least one of the controllers, to which the notification has been transferred, to the storage device through the connection apparatus, and a notification controlling section that changes over, when it is detected by the monitoring section that the access has been terminated, a transfer destination of the notification by the notification section to one or more of the controllers to which the notification has not been transferred.

16 Claims, 7 Drawing Sheets

CONNECTION APPARATUS, PROCESSING METHOD FOR CONNECTION APPARATUS AND COMPUTER-READABLE RECORDING MEDIUM IN WHICH PROCESSING PROGRAM IS RECORDED

CROSS-REFERENCE TO RELATED APPLICATION

This application is based upon and claims the benefit of priority of the prior Japanese Patent Application No. 2011-285715, filed on Dec. 27, 2011, the entire contents of which are incorporated herein by reference.

FIELD

The present case relates to a connection apparatus interposed between a storage device and a plurality of controllers for controlling the storage device, a storage apparatus, a processing method for a connection apparatus and a processing program.

BACKGROUND

Where a storage apparatus incorporates a great number of devices such as HDDs (Hard Disk Drives) ready for the SAS (Serial Attached SCSI) which is one of the SCSI (Small Computer System Interface) standards, a SAS Expander (hereinafter referred to as EXP) is sometimes used.

The EXP is a SAS switch used for expanding a SAS connection.

FIG. 7 is a view illustrating an example of a configuration of a storage system including a plurality of SAS devices 700 and EXPs 400 and 600. Particularly, FIG. 7 illustrates an example of a large-scale storage system which uses a great number of SAS devices 700 and EXPs 400 and 600.

As illustrated in FIG. 7, the storage system includes a storage apparatus 100 including a controller enclosure (hereinafter referred to as CE) 200 and a plurality of drive enclosures (hereinafter referred to as DEs) 500, and a host 800.

It is to be noted that, in FIG. 7, a double line indicates a host interface and a single line indicates a SAS connection.

The CE 200 carries out control of a data access request for writing and readout of data and so forth from the host 800 to the SAS devices 700, and includes a controller module (hereinafter referred to as CM) 300 and an EXP 400.

The CM 300 is a module that manages subordinate SAS devices 700 and allocates an appropriate SAS device 700 to a data access request from the host 800 such as a server to a SAS device 700. Further, the CM 300 functions as an initiator of the SAS devices 700 and the EXPs 400 and 600 and carries out access to a SAS device 700 that is an access target through the subordinate EXPs 400 and 600.

The EXP 400 is a module for expanding a SAS connection and includes an expander chip that is a SAS controlling device and a Phy that is a physical port of the SAS.

Further, the EXP 400 is connected to the CM 300 and the EXP 600 in the subordinate DE 500 through the Phy and transfers a data access request from the CM 300 to the EXP 600 that is an access target.

It is to be noted that, in order to achieve redundancy, the CE 200 includes a plurality of (eight in the example illustrated in FIG. 7) CMs 300 and has a multi-initiator configuration. Further, in order to achieve redundancy, the CE 200 includes a plurality of (two in the example illustrated in FIG. 7) EXPs 400.

The DE 500 incorporates a plurality of SAS devices (SAS drives) 700 such as HDDs therein and includes a plurality of (two in the example illustrated in FIG. 7) EXPs 600 in order to achieve redundancy. It is to be noted that, in FIG. 7, while illustration of some SAS devices 700 and illustration of reference numerals 600 and 700 in some DEs 500 is omitted for simplified illustration of the figure, all of the DEs 500 have a similar configuration.

It is to be noted that, in a data path from a CM 300 to a DE 500, the CM 300 side and the DE 500 side are hereinafter referred to as upper side and lower side, respectively.

The EXP 600 has a configuration similar to that of the EXPs 400 in the CE 200 and is connected to the EXP 400 in a CE 200 and/or an EXP 600 in a different DE 500 through a Phy (physical port) not illustrated. The EXP 600 carries out a process in accordance with a data access request from the upper side, that is, from the CM 300 side.

It is to be noted that, when it is necessary to specify one of the CMs 300 in the following description, one of CMs 00 to 07 is used as illustrated in FIG. 7. Further, when it is necessary to specify one of the EXPs 400 or 600 in the following description, one of EXPs 00, to 17, 20 to 27, 30 to 37 and 40 to 47 is used as illustrated in FIG. 7.

As illustrated in FIG. 7, in the storage apparatus 100, the CMs 00 to 07 are connected to the upper side of the EXPs 00 and 01. Further, the EXPs 10 to 13 are connected to the lower side of the EXP 00 while the EXPs 14 to 17 are connected to the lower side of the EXP 01.

Further, the EXPs 20, 30 and 40 are cascade-connected (multistage-connected) in series to the EXP 10; the EXPs 21, 31 and 41 to the EXP 11; EXPs 22, 32 and 42 to the EXP 12; and the EXPs 23, 33 and 43 to the EXP 13. Similarly, the EXPs 24, 34 and 44 are cascade-connected (multistage-connected) in series to the EXP 14; the EXPs 25, 35 and 45 to the EXP 15; the EXPs 26, 36 and 46 to the EXP 16; and the EXPs 27, 37 and 47 to the EXP 17.

Further, the two EXPs 600 in each DE 500 are connected to at least one SAS device 700 included in the DE 500 to which the EXPs themselves belong.

The storage apparatus 100 configured in such a manner as described above can connect a great number of SAS devices 700 using the EXPs 400 and 600.

Here, the EXPs 400 and EXPs 600 are provided two by two in each enclosure for redundancy. In the redundant EXPs 400 and 600, the series in which the EXP 00 in the CE 200 and each of the EXPs 10 to 13 in the DEs 500 are connected to each other is hereinafter referred to as first series, and the series in which the EXP 01 in the CE 200 and each of the EXPs 14 to 17 in the DEs 500 are connected to each other is hereinafter referred to as second series.

It is to be noted that the EXPs 10 to 13, EXPs 20 to 23, EXPs 30 to 33 and EXPs 40 to 43 of the individual systems in the first series are hereinafter referred to collectively as EXPs 10 to 43.

Incidentally, if some state variation occurs with one of the subordinate SAS devices 700 of the EXPs 10 to 43 of the first series in the configuration of FIG. 7, then the EXP 600 to which the SAS device 700 is connected issues a broadcast change (hereinafter referred to as BC (CHG)) to the upper side. It is to be noted that the state variation of a SAS device 700 may be, for example, insertion and pullout of a SAS device 700 or device disorder.

The BC (CHG) is a notification indicating occurrence of a state variation and is transferred to all of the CMs 300 through the EXPs 600 and 400 on the upper side from the EXP 600 that is an issuance source.

The CM 300 that is an initiator carries out, after reception of the BC (CHG), a discovery process for re-recognizing the subordinate SAS devices 700.

It is to be noted that, since the EXPs 400 and 600 receiving the BC (CHG) transfer the BC (CHG) to all of the SAS ports, that is, to all of the Phys, the BC (CHG) is propagated to the upper side, and as a result, all of the CMs 300 start a discovery process at a substantially same timing.

In the discovery process, the CM 300 issues a plurality of SMP (SAS Management Protocol) Functions to all of the EXPs 400 and 600 connected to the lower side. The SMP Function is a command defined by the SMP which is a protocol for managing the EXP, and is used for acquisition of information of the subordinate SAS devices 700 of the EXP, construction of routing information of the EXP, construction of topology, control of the Phys, link negotiation for the SAS connection and so forth.

The CM 300 issues five to ten SMP Functions (commands), for example, to each of the EXPs 400 or the EXPs 600 in order to acquire information intended for the discovery process.

The EXPs 400 and 600 receiving the SMP Function issue information corresponding to a kind of the command, for example, information of the number of the Phys possessed thereby and the SAS devices 700 connected to the Phys, as map information to the CM 300.

The CM 300 manages the information of the SAS devices 700 on the lower side using the map information transmitted thereto from the EXPs 400 and 600 on the lower side.

[Patent Document 1] Japanese Laid-Open Patent Publication No. 2006-279347

[Patent Document 2] Japanese Laid-Open Patent Publication No. 2009-540436

As described above, in the discovery process, the CM 300 issues a plurality of SMP Functions to all of the EXPs 400 and 600.

On the other hand, the EXPs 400 and 600 can carry out processes regarding the received plural SMP Functions only one by one.

Accordingly, in the multi-initiator environment illustrated in FIG. 7, there is a subject that, when the discovery process occurs, accesses by the SMP Functions from the plural CMs 300 conflict and a high load is applied to the EXPs 400 and 600.

SUMMARY

According to an aspect of the embodiments, a connection apparatus interposed between a storage device including at least one storage section and a plurality of controllers for controlling the storage device, the connection apparatus comprising a processor, and wherein the processor transfers, when a notification indicating occurrence of a state variation relating to the storage section is received from the storage device, the notification to at least one of the controllers, monitors access from the at least one of the controllers, to which the notification has been transferred, to the storage device through the connection apparatus, and changes over, when it is detected by the monitoring that the access has been terminated, a transfer destination of the notification to one or more of the controllers to which the notification has not been transferred.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

In the following, an embodiment is described with reference to the drawings.

[1] Embodiment

[1-1] Example of the Configuration of the Storage System

Figure 1:
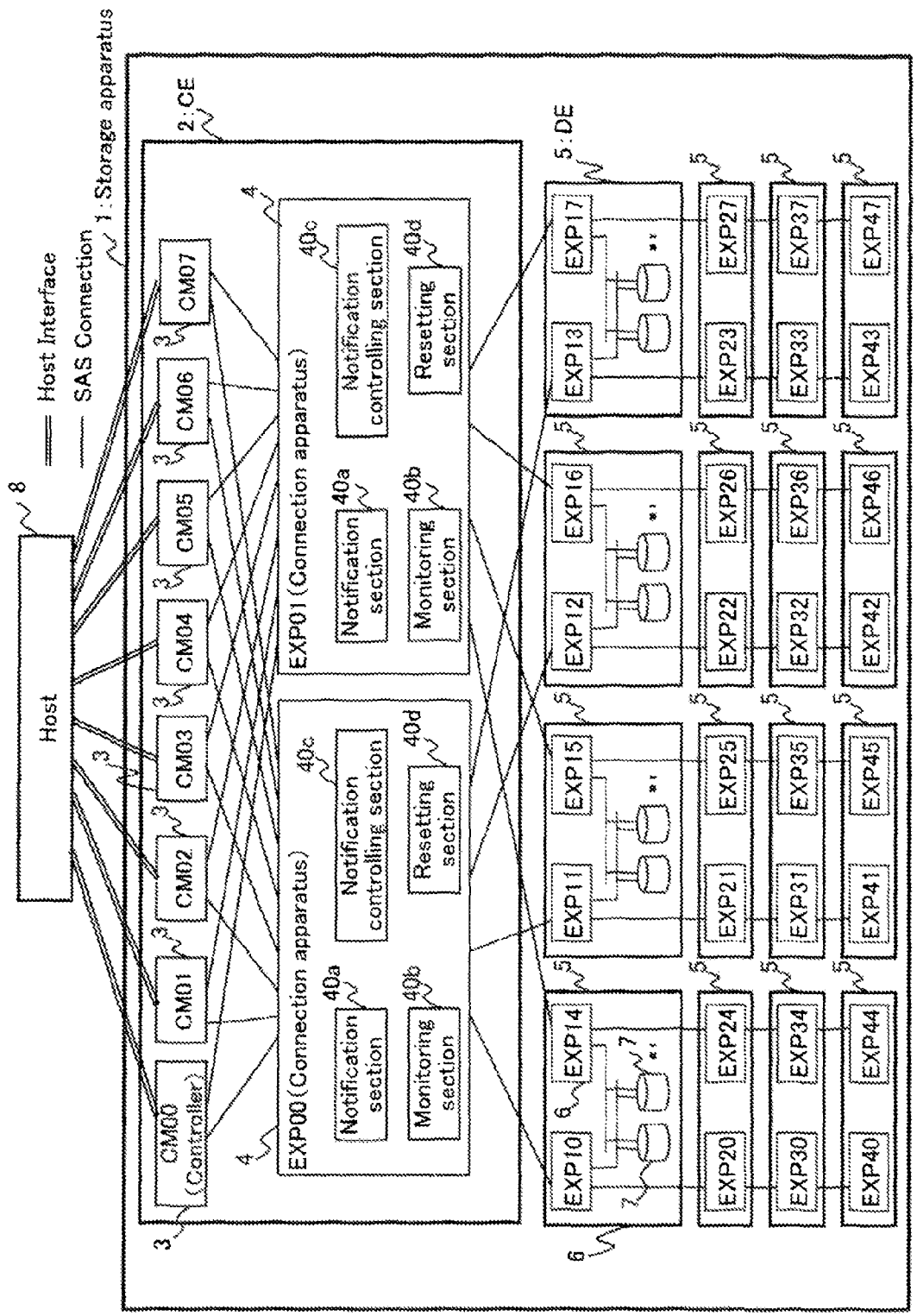
FIG. 1 is a block diagram illustrating an example of a configuration of a storage system as an embodiment.
Figure 2:
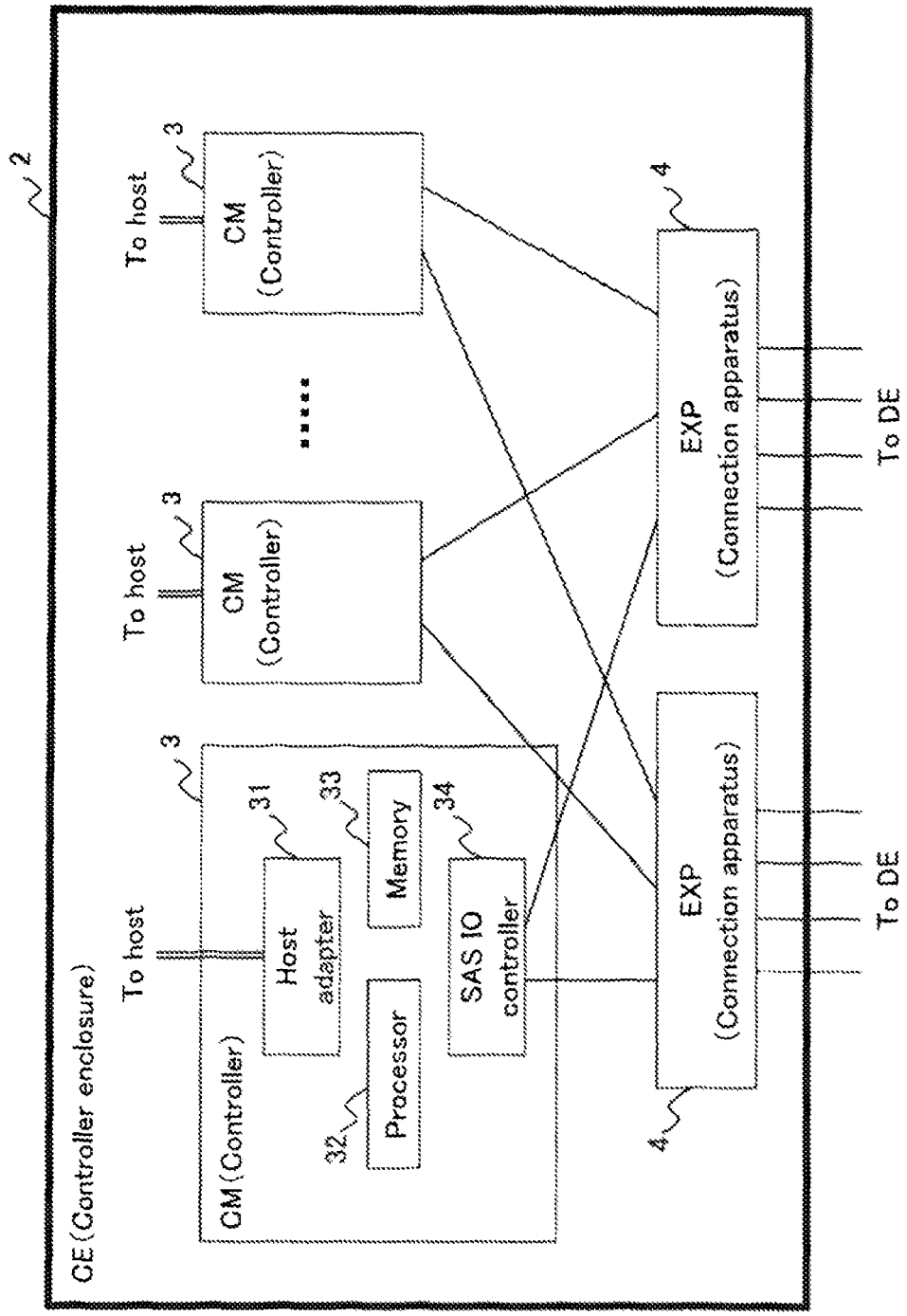
FIG. 2 is a block diagram illustrating an example of a configuration of a controller enclosure according to the present embodiment.
Figure 3:
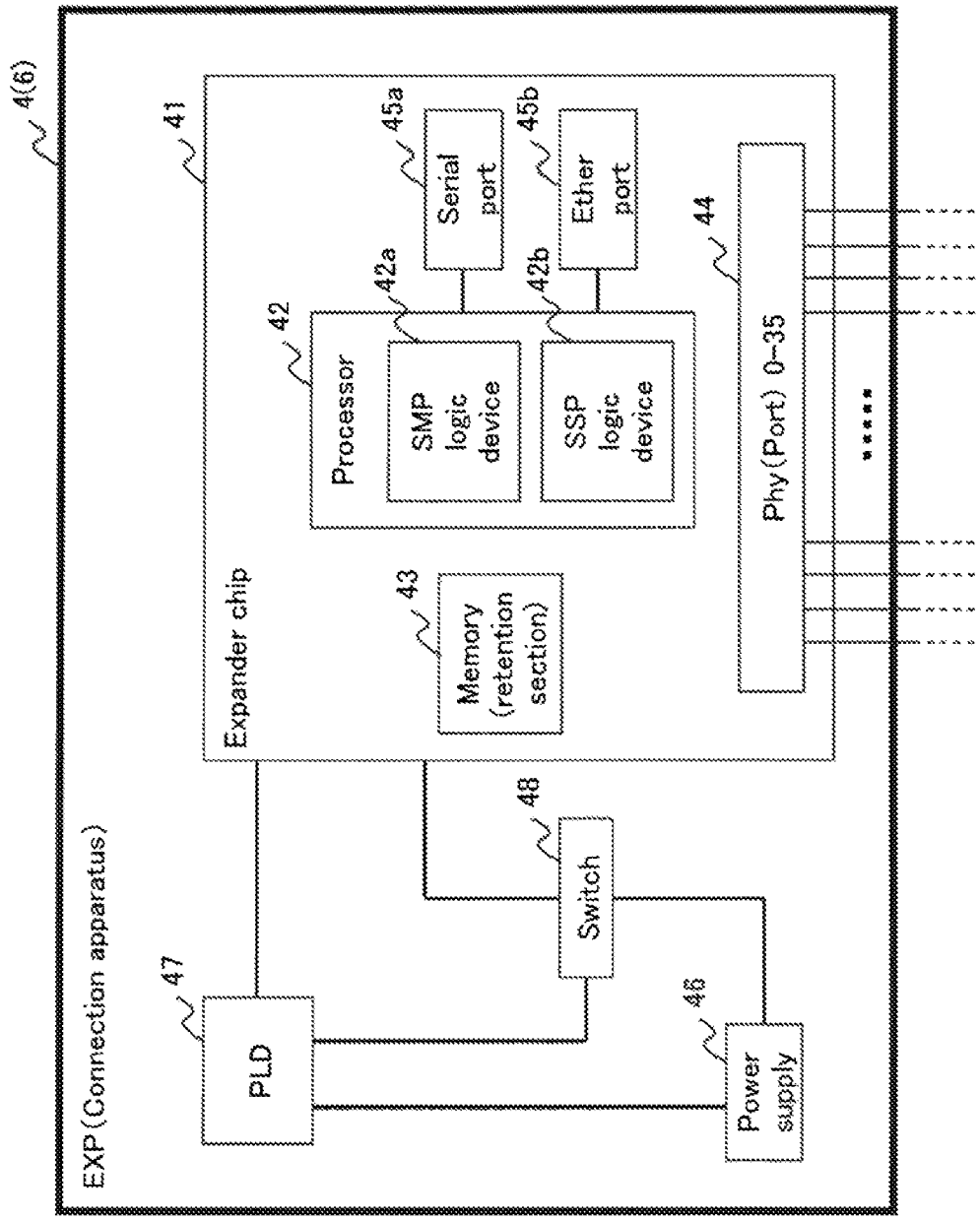
FIG. 3 is a block diagram illustrating an example of a configuration of an expander according to the present embodiment.
Figure 4:
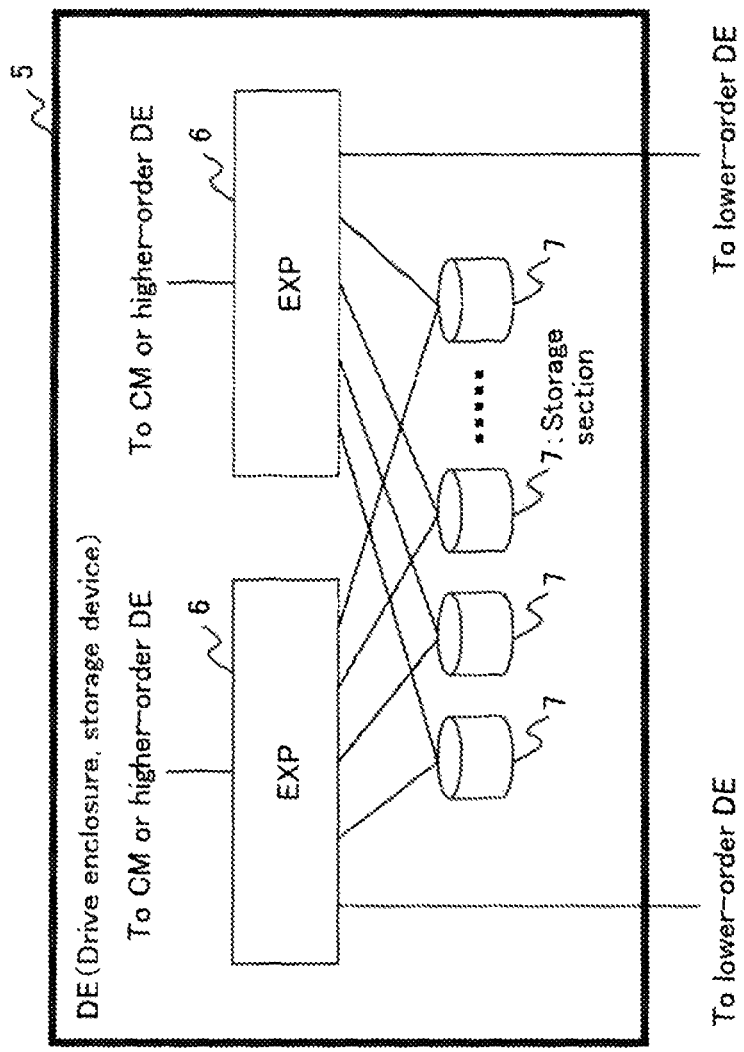
FIG. 4 is a block diagram illustrating an example of a configuration of a drive enclosure according to the present embodiment.

FIG. 1 is a block diagram illustrating an example of a configuration of a storage system as an embodiment, and FIG. 2 is a block diagram illustrating an example of a configuration of a controller enclosure 2 according to the present embodiment. Further, FIG. 3 is a block diagram illustrating an example of a configuration of expanders 4 and 6 according to the present embodiment, and FIG. 4 is a block diagram illustrating an example of a configuration of a drive enclosure 5.

As illustrated in FIG. 1, the storage system according to the present embodiment includes a storage apparatus 1 including a CE 2 and a plurality of DEs 5, and a host 8.

It is to be noted that, in FIG. 1, a double line indicates a host interface and a single line indicates a SAS connection.

Further, in a data path from a CM 3 to the DE 5, the CM 3 side is hereinafter referred to sometime as upper side and the DE 5 side is hereinafter referred to sometimes as lower side.

The host 8 is an apparatus that issues a data access request for writing and readout of data to a SAS device 7 included in the storage apparatus 1. As the host 8, an information processing apparatus such as a server is available.

The CE 2 is a control apparatus for carrying out control relating to a data access request issued from the host 8, and includes a plurality of (eight in the example illustrated in FIG. 1) CMs 3 and a plurality of (two in the example illustrated in FIG. 1) EXPs 4 in order to achieve redundancy.

The CMs (controllers) 3 carry out control for the DEs 5, and, similarly to the CMs 300 described above, each CM 3 is a module that manages subordinate SAS devices 7 and allocates an appropriate SAS device 7 to a data access request issued from the host 8.

As illustrated in FIG. 2, each CM 3 particularly includes a host adapter 31, a processor 32, a memory 33 and a SAS IO (Input Output) controller 34.

The host adapter 31 receives information such as a data access request from the host 8 or the like and transmits information such as data, a command or the like from the EXP 4 or a DE 5 to the host 8, and is connected through a host interface to the host 8.

The processor 32 is a processing apparatus such as a CPU (Central Processing Unit) or an MPU (Micro Processing Unit) for carrying out various controlling processes and arithmetic operations, and executes a program stored in a ROM (Read Only Memory) not illustrated to implement various functions of the CM 3. In the present embodiment, the processor 32 carries out a process relating to a data access request from the host 8 and executes a discovery process.

The memory 33 is a storage device for temporarily storing various kinds of data or programs, and temporarily stores and develops, when the processor 32 executes a program, the data or the program to use the same. It is to be noted that, as the memory 33, for example, a volatile memory such as a RAM (Random Access Memory) is available.

The SAS IO controller 34 controls is a controller responsible for inputting and outputting to and from the subordinate EXPs 4 and is SAS-connected by a cable or the like to a Phy 44 hereinafter described of the EXPs 4.

Further, the CM 3 functions as an initiator of the SAS devices 7 or the EXPs 4 and 6 and carries out access to a SAS device 7 that is an access target through the subordinate EXPs 4 and 6.

Furthermore, similarly to the CM 300 described hereinabove, the CM 3 receives a BC (CHG) issued from a DE 5 (EXP 6) through an EXP 4, that is, a notification indicating occurrence of a state variation, and then starts a discovery process for re-recognizing the subordinate SAS devices 7.

In particular, in the discovery process, the CM 3 issues an SMP Function (controlling information) through the EXPs 4 to all of the EXPs 4 and DEs 5 (EXPs 6) connected to the lower side by the SAS IO controller 34.

It is to be noted that, as described above, the SMP Function is a protocol for managing EXPs and is used for acquisition of information of the subordinate SAS devices 7 of the EXPs, construction of routing information of the EXPs, construction of topology, control of the Phys, link negotiation of SAS connections and so forth.

For example, the SMP Function is controlling information for requesting map information (connection information) that indicates a connection state or the like of devices such as EXPs 6 and SAS devices 7 connected to the subordinate DEs 5 (EXPs 6) of the EXP 4 or 6, that is, to the lower side of the EXP 4 or the EXP 6. In this manner, the SMP Function is information used for controlling the EXPs 4 and the DEs 5 in response to occurrence of a state variation.

The CM 3 issues a plurality of (for example, five to ten) SMP Functions, for example, to each EXP 4 or 6 in order to acquire such information intended for the discovery process as described above.

Further, in the discovery process, the CM. 3 can store a response (response information) received from an EXP 4 or a DE 5 (EXP 6) into a storage device such as the memory 33 and can manage the information of the SAS devices 7 on the lower side using the map information.

In the example illustrated in FIG. 1, the CM 3 can recognize the DEs 5 (EXPs 6) to which a SMP Function is to be issued as the EXPs 10 to 13 in accordance with the map information from within the response (response information) to the SMP Function to the EXP 4. Further, the CM 3 can recognize, for example, the subordinate EXPs 6 of the EXPs 10 to 13 as the EXPs 20 to 23 in accordance with the map information from within the response (response information) of the SMP Function to the EXP 6.

In particular, the CM 3 can recognize the DEs 5 (EXPs 6) to which the SMP Function is to be issued in accordance with the map information.

It is to be noted that the map information transmitted from the EXPs 4 and 6 includes the number of Phys 44 owned by each of the EXPs 4 and 6 that are transmission sources, information of the SAS devices 7 connected to the Phys 44 and so forth.

The EXP (connection apparatus) 4 is a module that is interposed between the DEs 5 and the plural CMs 3 and carries out expansion of a SAS connection, and transfers a data access request from a CM 3 to the DE 5 (EXP 6) that is an access target.

In particular, the EXP 4 includes an expander chip 41, a power supply 46, a PLD (Programmable Logic Device) 47 and a switch 48 as illustrated in FIG. 3.

The expander chip 41 is a controlling device for the SAS, and includes a processor 42, a memory 43, a Phy 44, and a serial port 45a and an Ether port 45b that are interfaces for serial connection and Ethernet (registered trademark) connection, respectively.

The processor 42 is a processing apparatus such as a CPU or an MPU which carries out various controls and arithmetic operations, and executes a program stored in a ROM not illustrated or the like to implement various functions of the EXP 4. In the present embodiment, the processor 42 carries out not only control of the Phy 44 that is a physical port of the SAS but also a process relating to the SMP Function as an SMP logical device, and further carries out, as an SSP (Serial SCSI Protocol) logical device, a process relating to a SCSI command.

Further, the EXP 4 according to the present embodiment includes functions as a notification section 40a, a monitoring section 40b, a notification controlling section 40c and a resetting section 40d hereinafter described. The functions are implemented by the processor 42.

The memory (retention section) 43 is a storage device for temporarily storing various kinds of data and programs. When the processor 42 is to execute a program, it temporarily stores, develops and uses the data or the program. It is to be noted that, as the memory 43, a volatile memory such as, for example, a RAM is used.

The Phy 44 is a physical port SAS-connected by a cable or the like to CMs 3 and the EXPs 6 in the DEs 5, and includes ports 0 to 35 in the example illustrated in FIG. 3. It is to be noted that, though not illustrated, the SAS device 7 can be provided also in the CE 2. In this instance, the EXPs 4 are connected to the SAS device 7 in the CE 2 through the Phy 44.

The power supply 46 supplies power to the expander 4 with the power from an external power supply not illustrated, and the PLD 47 operates with a resident power supply from the power supply 46 or the like to carry out power supply control of the expander 4 and so forth. In particular, the PLC 47 carries out control for supplying the power from the power supply 46 to the expander chip 41 through the power supply control for the switch 48.

When a BC (CHG) is received from a DE 5 (EXP 6), in order to re-recognize the subordinate SAS devices 7 and EXPs 6, the EXP 4 executes a discovery process and issues an SMP Function to the EXPs 6 connected to the lower side. The SMP Function is a command for requesting, for example, for state information of the DEs 5 such as a route table after updating in the EXPs 6 connected to the lower side.

Then, if a response to the SMP Function is received from the EXPs 6 connected to the lower side, then the EXP 4 updates (produces) a route table (state information) of itself based on the state information from within the response and stores the updated route table into the storage device such as the memory 43.

Further, if the EXP 4 acquires the state information by execution of the discovery process, then the EXP 4 transfers a BC (CHG) to the CM 3. However, upon transfer of the BC (CHG) to the CM 3, the EXP 4 according to the present embodiment carries out processes hereinafter described by the notification section 40*a*, monitoring section 40*b*, notification controlling section 40*c* and resetting section 40*d*.

It is to be noted that, when the EXP 4 receives an SMP Function from the CM 3 to which the BC (CHG) has been transferred, the EXP 4 carries out a process in response to the received command, for example, a process for acquiring information of the Phys 44 of itself or devices connected to the Phy 44. Then, the EXP 4 places the acquired information into the response and returns the acquired information as map information included in the response to the CM 3.

As illustrated in FIG. 4, the DE (storage device) 5 includes at least one SAS device 7 and includes a plurality of (two in the example illustrated in FIG. 4) EXPs 6 in order to achieve redundancy. It is to be noted that, while, in FIG. 1, illustration of some SAS devices 7 in the DE 5 and illustration of some reference numeral 6 and 7 are omitted in order to simplify the figure, all of the DEs 5 include a similar configuration.

The SAS device (storage section) 7 is hardware for storing various kinds of data, programs and so forth such as a magnetic disk apparatus such as an HDD ready for the SAS or the like. It is to be noted that, as the SAS device 7, a different device ready for the SAS may be used.

The EXP 6 includes a similar configuration to that of the EXP 4 illustrated in FIG. 2, and is SAS-connected by a cable or the like to the EXPs 4 in the CE 2 and/or the EXPs 6 of other different DEs 5 through the Phy 44 illustrated in FIG. 3. The EXP 6 carries out a process corresponding to a data access request from the upper side, that is, from the CM 3 side.

Further, when a state variation in the DE 5, that is, relating to a SAS device 7 directly connected to the EXP 6 occurs, the EXP 6 updates (produces) a route table (state information) and stores, in order to re-recognize the SAS devices 7 connected to the Phy 44, the updated route table into the storage device such as the memory 43 or the like.

It is to be noted that the case in which a state variation occurs may be, for example, a case in which link-up/linkdown of the Phy 44 occurs or insertion and pullout of a SAS device 7 occurs.

Furthermore, the EXP 6 issues a BC (CHG) to all of the Phys 44, for example, to the other EXPs 4 or 6 connected to the upper side illustrated in FIG. 1.

Further, in order to re-recognize the subordinate SAS devices 7 or EXPs 6, the EXP 6 on the upper side receiving the BC (CHG) from an EXP 6 connected to the lower side executes a discovery process and issues an SMP Function to the EXPs 6 connected to the lower side. The SMP Function is a command for requesting, for example, for information of a route table after updating in the EXPs 6 connected to the lower side.

Then, if a response to the SMP Function is received from the EXPs 6 connected to the lower side, then the EXP 6 on the upper side updates (produces) a route table (state information) of itself based on state information from within the response and stores the updated route table into the storage device such as the memory 43.

Further, the EXP 6 on the upper side transfers the BC (CHG) to all of the Phys 44, for example, the EXPs 4 or 6 connected to the upper side.

Further, when the EXP 6 receives the SMP Function issued from the CM 3, it carries out a process in response to the received command, for example, a process for acquiring information of the Phy 44 of itself or devices connected to the Phy 44 and places the acquired information into the response and returns the acquired information as map information included in the response to the CM 3.

It is to be noted that, when it is necessary to specify one of the CMs 3 in the following description, one of the CMs 00 to 07 is used as illustrated in FIG. 1. Further, when it is necessary to specify one of the EXPs 4 or 6 in the following description, one of the EXPs 00, 10 to 17, 20 to 27, 30 to 37 and 40 to 47 is used as illustrated in FIG. 1.

As illustrated in FIG. 1, in the storage apparatus 1, the CMs 00 to 07 are connected to the upper side of the EXPs 00 and 01. Further, the EXPs 10 to 13 are connected to the lower side of the EXP 00, and the EXPs 14 to 17 are connected to the lower side of the EXP 01.

Further, the EXPs 20, 30 and 40 are cascade-connected (successively connected, connected in multistage) in series to the EXP 10; the EXPs 21, 31 and 41 to the EXP 11; the EXPs 22, 32 and 42 to the EXP 12; and the EXPs 23, 33 and 43 to the EXP 13. Similarly, the EXPs 24, 34 and 44 are cascade-connected (successively connected, connected in multistage) in series to the EXP 14; the EXPs 25, 35 and 45 to the EXP 15; the EXPs 26, 36 and 46 to the EXP 16; and the EXPs 27, 37 and 47 to the EXP 17.

Further, the two EXPs 6 in each DE 5 are connected to at least one SAS device 7 included in the DE 5 of themselves.

Here, two EXPs 4 and two EXPs 6 are provided in each enclosure in order to achieve redundancy. In the following description, from among the redundant EXPs 4 and 6, a series in which the EXP 00 in the CE 2 and each of the EXPs 10 to 13 in the DEs 5 are connected to each other is referred to as first series and the other series in which the EXP 01 in the CE 2 and each of the EXPs 14 to 17 in the DEs 5 are connected to each other is referred to as second series.

Figure 5:
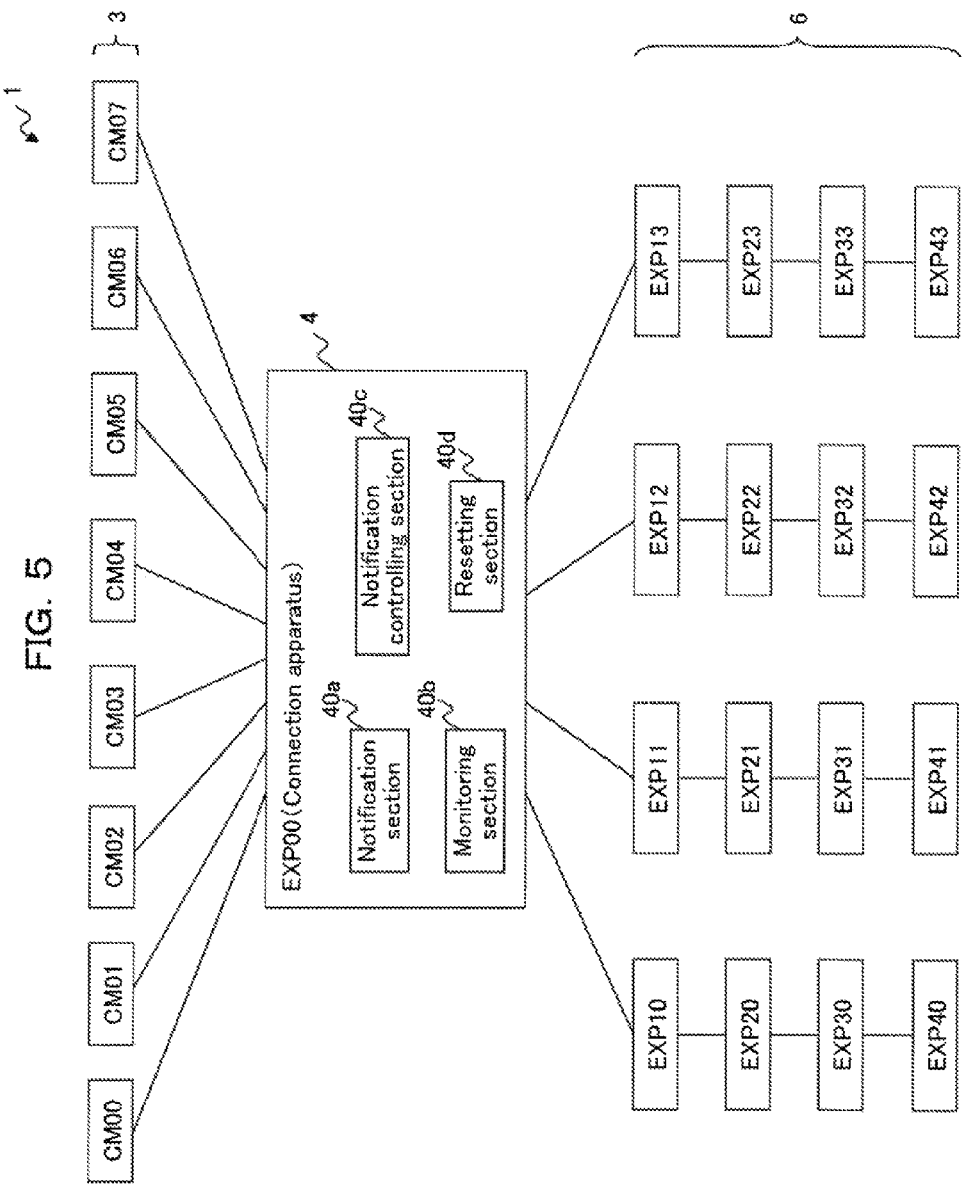
FIG. 5 is a block diagram particularly illustrating controller modules and expanders of a first series of a storage apparatus illustrated in FIG. 1.

As described above, the storage apparatus 1 has a configuration in which, in the first series, all of the CMs 3 are connected to one EXP 4 (EXP 00) and the plural EXPs 6 are disposed in cascade connection in series from the EXP 00 individually for the plural lines under the EXP 00 as illustrated in FIGS. 1 and 5. In particular, to the EXP 4, a plurality of DEs 5 individually including at least one SAS device 7 are directly connected in the plural lines or successively connected to the directly connected DE 5. It is to be noted that the plural lines include a line connected in series from the EXP 10, another line connected in series from the EXP 11, a further line connected in series from the EXP 12 and a still further line connected in series from the EXP 13.

It is to be noted that the EXPs 10 to 13, 20 to 23, 30 to 33 and 40 to 43 in the lines in the first series are hereinafter referred to collectively as EXPs 10 to 43.

[1-2] Description of the Expander

Now, functions as the notification section 40*a*, monitoring section 40*b*, notification controlling section 40*c* and resetting section 40*d* in the EXP 4 are described with reference to FIG. 5.

If the EXP 4 receives a BC (CHG) that is a notification indicating occurrence of a state variation relating to a SAS device 7 from an EXP 6 connected to the lower side as described above, then it executes a discovery process to acquire state information.

Then, the EXP 4 acquires the state information from all of the DEs 5 by the discovery process and functions, when the BC (CHG) is to be transferred to the CM 3, as the notification section 40a, monitoring section 40b, notification controlling section 40c and resetting section 40d.

The notification section 40a transfers the BC (CHG) to at least one of the plural CMs 3 which are transfer destinations. It is to be noted that the at least one of the plural CMs 3 signifies a number of CMs 3 equal to or greater than one but smaller than that (eight in the example illustrated in FIG. 5) of the CMs 3 in the CE 2 and is, in the example given below, one CM 3.

In particular, the notification section 40a selects a CM 3 of a transfer destination to which the BC (CHG) is to be transferred based on connection configuration information set in advance. For example, in the example illustrated in FIG. 5, the EXP 4 selects the CM 00 having the smallest number (lowest number) from among the CMs 00 to 07 as the CM 3 to which the BC (CHG) is to be transferred. It is to be noted that the connection configuration information is information indicating a connection relationship between the CMs 3 and the EXPs 4 and 6 in the storage apparatus 1.

Further, the notification section 40a carries out queuing of information indicating occurrence of a state variation to be transferred to the CMs 3 other than the selected CM 3 (for example, the CM 00), that is, information of the BC (CHG), into a buffer such as the memory 43.

It is to be noted that, as described above, the CM 3 to which the BC (CHG) is transferred executes a discovery process and issues an SMP Function to the EXP 4, and the EXP 4 places the map information into a response to the SMP Function to the EXP 4 itself and returns the map information to the CM 3. Then, the CM 3 executes a discovery process for the subordinate DEs 5 of the EXP 4 based on the map information from the EXP 4.

The monitoring section 40b monitors access arising from the discovery process from the CM 3 (for example, the CM 00) to which the BC (CHG) has been transferred by the notification section 40a to the EXP 4 or the DE 5 through the EXP 4 and detects that the access has been terminated.

In particular, the monitoring section 40b monitors an SMP Function issued from the CM 3 to which the BC (CHG) has been transferred to the EXP 4 or the DE 5 and used for controlling the EXP 4 or the DE 5 in response to occurrence of a state variation, or a response to the SMP Function issued from the EXP 4 or the DE 5 to the CM 3, or any combination thereof. Then, when the issuance of the monitored SMP Function or response or any combination thereof is terminated, the monitoring section 40b detects that the access by the CM 3 to which the BC (CHG) has been transferred comes to an end. It is to be noted that, in the following example, the monitoring section 40b monitors an SAS frame issued from the CM 3 to which the BC (CHG) has been transferred to the EXP 4 or the DE 5, that is, an SMP Function.

It is to be noted that the monitoring section 40b places, for example, the Phy 44 that is a SAS port to the CM 3 and/or to the EXP 6 to which the BC (CHG) has been transferred into a monitored state to monitor information (SAS frame) that passes the Phy 44 to carry out the monitoring of the access described above.

Further, when the EXP 4 has a plurality of subordinate DEs 5 (EXPs 6) as illustrated in FIG. 5, the monitoring section 40b detects that the access from the CM 3 comes to an end when the access from the CM 3 to which the BC (CHG) has been transferred to the last DE 5 (EXP 6) from among the plural DEs 5 comes to an end. For example, when, in the example of FIG. 5, the CM 3 issues an SMP Function in order from the EXP 10 to the EXP 43, the monitoring section 40b detects that the access from the CM 3 comes to an end when the access from the CM 3 to the EXP 43 comes to an end.

It is to be noted that the monitoring section 40b can decide (detect) which one of the plural DEs 5 (EXPs 6) is the last DE 5 based on the map information acquired in response to the SMP Function by the EXP 4. In particular, when the CM 3 recognizes the subordinate DEs 5 of the EXP 4 based on the map information acquired by the discovery process for the EXP 4 and determines an issuance order of an SMP Function to the DEs 5, the monitoring section 40b can predict a DE 5 to which the SMP Function is to be issued finally by the CM 3 based on the map information.

When it is detected by the monitoring section 40b that the access has been terminated, the notification controlling section 40c changes over the transfer destination of the BC (CHG) by the notification section 40a to one or more CMs 3 from among the CMs 3 to which the BC (CHG) has not been transferred. It is to be noted that, in the example given below, the one or more CMs 3 signifies one CM 3.

The notification controlling section 40c carries out changeover of the transfer destination of the BC (CHG) until the transfer of the BC (CHG) by the notification section 40a is carried out to all of the CMs 3.

In particular, if it is detected by the monitoring section 40b that the access from the CM 3 (for example, the CM 00) comes to an end, then the notification controlling section 40c selects a CM 3 (for example, the CM 01) that is a next transfer destination in a predetermined order (for example, in the order from the CM 3 having the smallest number) based on the connection configuration information described above. Then, the notification controlling section 40c controls the notification section 40a to transfer the BC (CHG) during queuing to the CM 3 of the selected transfer destination.

It is to be noted that the predetermined order is not limited to that described above, and, for example, another order from the CM having the greatest number from among the CMs 00 to 07 may be applied or a further order that is based on the port number of the Phy 44 of the EXP 4 to be connected to the CM 3 may be applied. In other words, any information may be used if ordering among the plural CMs 3 is possible.

Then, the notification section 40a transfers a BC (CHG) based on the information indicating occurrence of state variation stored in a buffer such as the memory 43 to the CM 3 of the next transfer destination selected by the notification controlling section 40c.

It is to be noted that the EXP 4 returns a response indicating that the process relating to the BC (CHG) comes to an end to the EXP 6 of the issuance source of the BC (CHG) taking, as an opportunity, that the discovery process (map information request) from all of the CMs 3 in the connection configuration information set in advance is processed.

In this manner, with the notification section 40a, monitoring section 40b and notification controlling section 40c, discovery processes from a plurality of CMs are not concentrated on the EXP 4. Therefore, a processing delay arising from a performance bottleneck of the EXP 4, an acquisition delay of the map information by the CM 3, occurrence of timeout and so forth can be avoided.

When another notification indicating occurrence of a state variation relating to a SAS device 7, that is, another BC (CHG), is received from a DE 5, the resetting section 40d resets the process relating to the former BC (CHG) in the notification section 40*a*, monitoring section 40*b* and notification controlling section 40*c*.

In particular, when the EXP 4 receives a BC (CHG) based on another state variation occurring with one of the DEs 5 in a state in which the discovery process in all of the CMs 3 does not comes to an end, the resetting section 40*d* stops the operation of the notification section 40*a* and causes the BC (CHG) during queuing to be discarded. Further, the resetting section 40*d* causes the monitoring section 40*b* to cancel the monitoring state of the Phy 44 and stops the operation of the notification controlling section 40*c*.

If resetting is carried out by the resetting section 40*d*, then the notification section 40*a* transfers another newly generated BC (CHG) to one of the plural CMs 3 similarly as in the operation described above.

[1-3] Example of Operation of the Storage Apparatus

Figure 6:
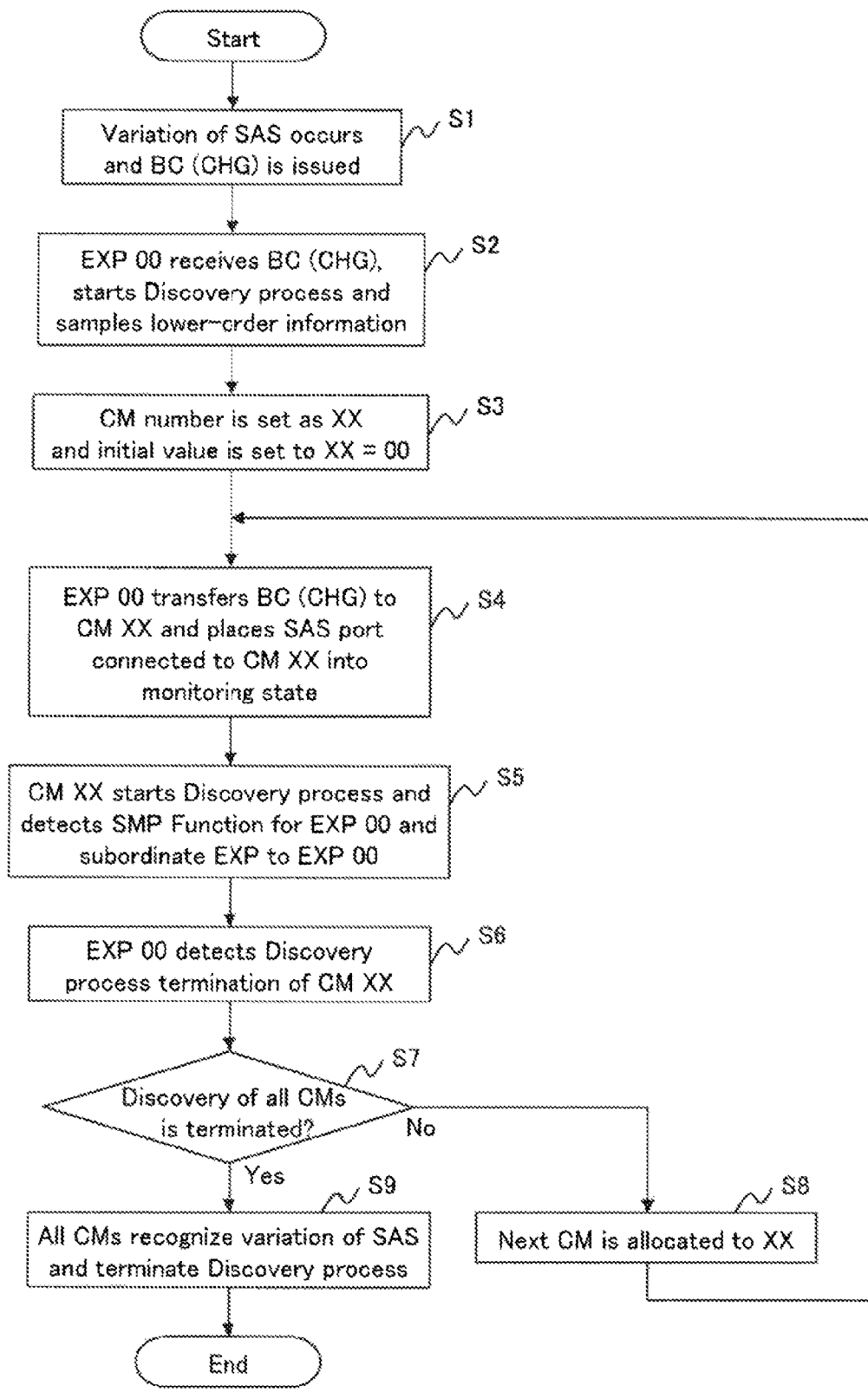
FIG. 6 is a flow chart illustrating an example of operation of the storage apparatus according to the present embodiment.
Figure 7:
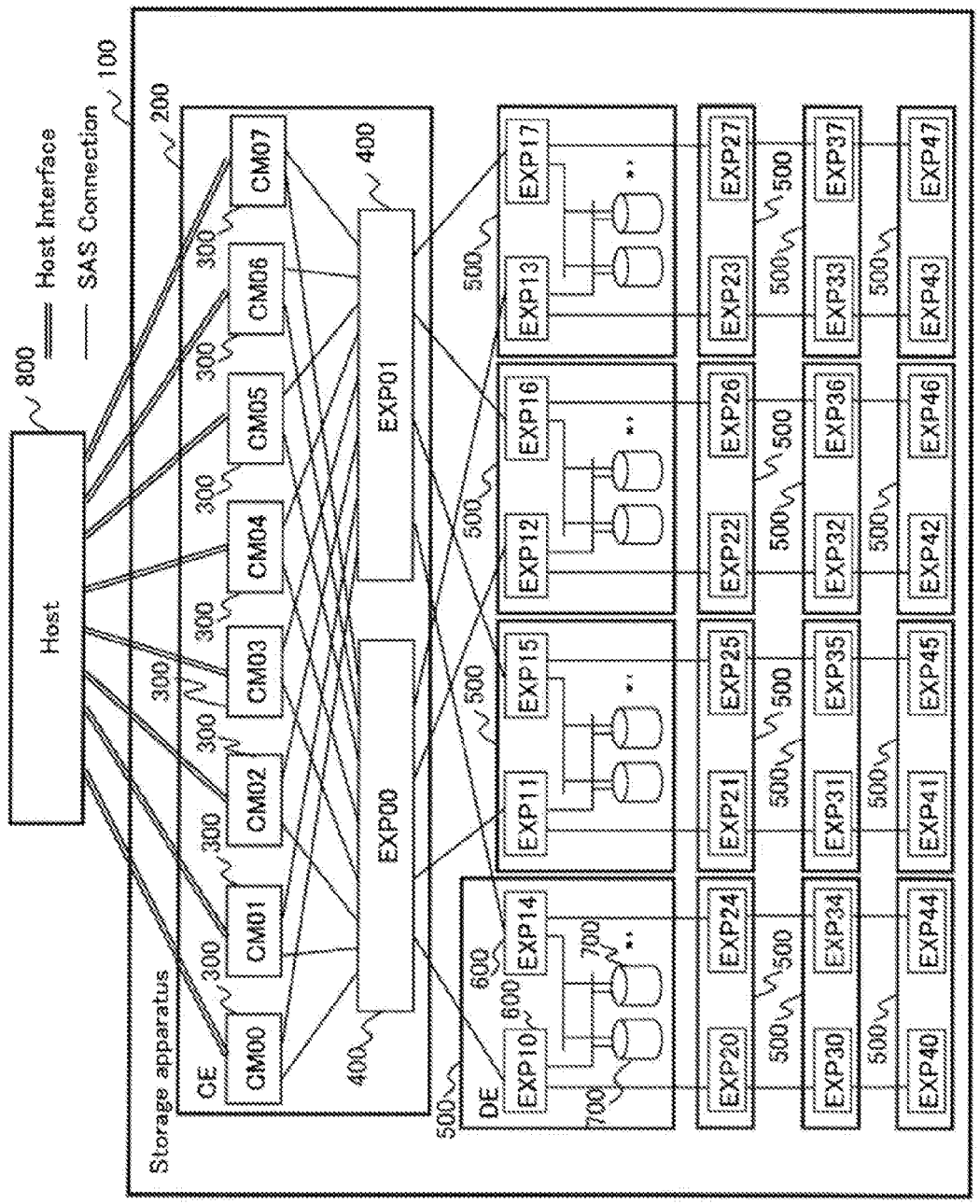
FIG. 7 is a block diagram illustrating an example of a configuration of a storage system that includes a plurality of SAS drives and EXPs.

Now, an example of operation upon issuing a BC (CHG) by the storage apparatus 1 according to the present embodiment configured in such a manner as described above is described with reference to FIGS. 5 and 6. It is to be noted that FIG. 6 is a flowchart illustrating an example of operation of the storage apparatus 1 according to the present embodiment.

First, if variation (state variation relating to a SAS device 7) of the SAS occurs in one of the DEs 5 (EXPs 10 to 43), then a BC (CHG) is issued to the EXPs 4 or 6 on the upper side by the EXP 6 that detects occurrence of the state variation (step S1).

For example, if occurrence of a state variation is detected in the EXP 30 illustrated in FIG. 5, then a BC (CHG) is issued to the EXP 20 on the upper side by the EXP 30. The EXP 20 receiving the BC (CHG) executes a discovery process to update a route table (state information) relating to the SAS devices 7 connected to the EXP 20 itself and the EXP 30 on the lower side and transfer the BC (CHG) to the EXP 10 on the upper side. Similarly, also the EXP 10 to which the BC (CHG) has been transferred executes a discovery process to update a route table (state information) relating to the SAS devices 7 on the lower side and the EXPs 20, 30 and 40 and transfer the BC (CHG) to the EXP 00 on the upper side.

Then, a discovery process is started for the EXPs 6 on the lower side by the EXP 4 receiving the BC (CHG) from the EXP 6 on the lower side and information such as the state information is collected from the EXPs 6 on the lower side (step S2).

For example, if the BC (CHG) issued from the EXP 30 illustrated in FIG. 5 is received, then the EXP 4 acquires state information from the EXPs 10 to 13 (and the SAS devices 7) connected to the lower side.

Then, by the EXP 4 (monitoring section 40*b*), the CM number is determined as XX and an initial value is set to XX=00 (step S3), and the BC (CHG) is transferred only to the CM 00 which is a CM 3 having the smallest number. It is to be noted that BCs (CHG) for the remaining CMs 01 to 07 are not transferred but are queued in the EXP 4 by the notification section 40*a*.

Further, by the EXP 4 (monitoring section 40*b*), the Phy 44 that is a SAS port to the CM 00 to which the BC (CHG) has been transferred is placed into a monitored state and a SAS frame from the CM 00 is monitored (step S4).

Then, a discovery process is started by the CM 00 receiving the BC (CHG) from the EXP 4.

First, an SMP Function is issued to the subordinate EXP 4 by the CM 00, and the map information that is a response from the EXP 4 is received. Then, if it is recognized by the CM 00 that there exist subordinate EXPs 10 to 13 of the EXP 4, then an SMP Function is issued individually to the EXPs 10 to 13 (step S5).

Then, by the CM 00, an SMP Function is issued, for example, in order of the EXPs 20 to 23, EXPs 30 to 33 and EXPs 40 to 43, and, if all of the EXPs 6 are recognized, then the discovery process by the CM 00 is ended (step S6).

It is to be noted that, when it is decided by monitoring of the SMP Function issued from the CM 00 by the monitoring section 40*b* that issuance of the SMP Function to the EXPs 40 to 43 at the lowest stage comes to an end, the EXP 4 decides that the discovery process by the CM 00 comes to an end.

Then, it is decided by the EXP 4 (notification controlling section 40*c*) whether or not the discovery processes by all of the CMs 3 come to an end (step S7), and, if the discovery processes do not come to an end (No route at step S7), then XX of the CM number is set to a next CM number (for example, XX=01 which is the second smallest number) in accordance with a predetermined order (step S8). In this instance, the BC (CHG) that has been queued is transferred to the CM 01 by the notification section 40*a* and the Phy 44 to the CM 01 is placed into a monitored state by the monitoring section 40*b* (step S4), and then the processing advances to step S5. It is to be noted that the monitoring state for the Phy 44 to the CM 00 by the monitoring section 40*b* is cancelled.

If the processes at steps S4 to S8 described above are carried out for all of the CMs 3, then it is decided at step S7 by the notification controlling section 40*c* that the discovery processes by all of the CMs 3 come to an end (Yes route at step S7). In other words, all of the CMs 3 have recognized variation of the SAS.

It is to be noted that, when a different new BC (CHG) is received by the EXP 4 during the processing at steps S4 to S8, the former BC (CHG) during queued is discarded by the resetting section 40*d* as described above, and the processes at the steps beginning with step S2 are carried out for the new BC (CHG).

As described above, with the EXP 4 according to the present embodiment, when a BC (CHG) is received from a subordinate EXP 6, a BC (CHG) is transferred to the CMs 3 one by one in order beginning with the CM 3 having the smallest number in place of operation of transferring a BC (CHG) at the same time to all of the CMs 3. More particularly, if the EXP 4 receives a BC (CHG) from a subordinate EXP 6, then the EXP 4 controls transmission of the BC (CHG) so that a discovery process is started for every one CM for all of the CMs 3 on the upper side.

Accordingly, since a time difference can be provided between the discovery processes of the CMs 3 and conflict among the discovery processes of the CMs 3 does not occur, access conflict to the EXPs 4 and 6 can be reduced. Particularly, since the CMs 3 can be prevented from starting a discovery process all at once in response to a BC (CHG) transmitted thereto from an arbitrary EXP 6, concentration of discovery processes from a great number of CMs 3 upon the EXP 4 can be prevented. Consequently, the EXP 4 can be prevented from being placed into a congestion state, and a processing delay by a performance bottleneck, an acquisition delay of map information by the CM 3, occurrence of timeout and so forth can be prevented. Particularly, a remarkable effect can be achieved in the configuration of the large-scale storage system illustrated in FIGS. 1 and 5 in which a plurality of initiators are connected to each EXP 4.

Further, with the EXP 4 according to the present embodiment, the monitoring section 40*b* monitors access to the DE 5 from a CM 3 to which a BC (CHG) has been transferred. Then, when it is detected by the monitoring section 40*b* that the access comes to an end, the notification controlling section 40c changes over the transfer destination of a BC (CHG) to one or more CMs 3 from among the CMs 3 to which the BC (CHG) has not been transferred. Since a BC (CHG) is transferred to the next CM 3 when the access by the discovery process of the CM 3 comes to an end, the EXP 4 can follow up the processing state of the discovery process to flexibly control starting of a discovery process of a next CM 3. Consequently, the resources can be effectively utilized.

It is to be noted that, with the monitoring section 40b according to the present embodiment, at least one of an SMP Function (controlling information) and the response (response information) between a CM 3 to which a BC (CHG) has been transferred and the DE 5 is monitored. Accordingly, when the issuance of the SMP Function or the response comes to an end, the EXP 4 can detect with certainty that the access relating to the discovery process by the CM 3 comes to an end.

Further, with the notification controlling section 40c according to the present embodiment, since changeover of the transfer destination is carried out until the transfer of a BC (CHG) by the notification section 40a is carried out to all of the CMs 3, all of the CMs 3 can acquire map information with certainty without being influenced by a processing delay of the discovery process, occurrence of timeout or the like.

Further, with the resetting section 40d according to the present embodiment, when a different notification indicating occurrence of a state variation relating to a SAS device 7, that is, a different BC (CHG), is received from the DE 5, the processes relating to the former notification in the notification section 40a, monitoring section 40b and notification controlling section 40c are reset. Further, the notification section 40a transfers a different BC (CHG) to at least one of the plural CMs 3 after the resetting. Consequently, when a different BC (CHG) is issued during processing relating to the former BC (CHG), a discovery process relating to the different BC (CHG) for acquiring information relating to the latest state of the storage apparatus 1 can be executed effectively (quickly).

[2] Others

While the preferred embodiment of the present invention is described in detail above, the present invention is not limited to the embodiment specifically described above, and variations and modifications can be made without departing from the scope of the present invention.

For example, while, in the embodiment described above, the notification section 40a selects one of the plural CMs 3 as a CM 3 of a transfer destination of a BC (CHG) and the notification controlling section 40c selects one of the CMs 3 to which the BC (CHG) is not transferred as a CM 3 of a next transfer destination, the present invention is not limited to this.

For example, the notification section 40a and the notification controlling section 40c may select two or more CMs 3 as transfer destinations at the same time and the notification section 40a may transfer a BC (CHG) to each of the two or more CMs 3. Also in this instance, since access conflict to the EXPs 4 and 6 can be reduced in comparison with an alternative case in which a BC (CHG) is transferred at the same time to all of the CMs 3, such an effect as described above can be obtained.

Further, while, in the embodiment described above, the notification controlling section 40c changes over the transfer destination of a BC (CHG) when it is detected by the monitoring section 40b that access between the CM 3 and the last DE 5 (EXP 6) comes to an end, the present invention is not limited to this.

For example, when the access between the CM 3 and a predetermined DE 5 (EXP 6) comes to an end in the monitoring by the monitoring section 40b, the notification controlling section 40c may change over the transfer destination and control the notification section 40a to transfer a BC (CHG). In particular, the transfer of the BC (CHG) may be carried out before the discovery process by the former CM 3 comes to an end. In this instance, the discovery process by the CM 3 to which the BC (CHG) is transferred previously and the discovery process by the CM 3 to which the BC (CHG) is transferred later are carried out in parallel within part of a time period. Also in this instance, since access conflict to the EXPs 4 and 6 can be reduced in comparison with an alternative case in which a BC (CHG) is transferred at the same time to all of the CMs 3, such an effect as described above can be achieved.

Furthermore, while, in the embodiment described above, a case is described in which a BC (CHG) is issued from the EXP 6, the present invention is not limited to this.

For example, when the CE 2 functions as a storage device including a SAS device 7 and the EXP 4 detects occurrence of a state variation of the SAS device 7, the EXP 4 executes a discovery process to acquire state information relating to the subordinate devices. Then, the notification section 40a issues a BC (CHG) as described above and can carry out the process described above with reference to FIG. 6 or the like.

It is to be noted that, while the EXPs 4 in the CE 2 and the EXPs 6 in each DE 5 illustrated in FIG. 1 are individually made redundant, in the foregoing description of the embodiment, description is given of the EXPs 4 taking notice of the first series as illustrated in FIG. 5. However, when occurrence of a state variation is detected in an arbitrary DE 5 (for example, in the DE 5 that includes the EXPs 30 and 34), actually a BC (CHG) is issued from both of the EXPs 30 and 34.

For example, when a BC (CHG) is issued from the EXPs 30 and 34, in both of the first and second series, propagation of the BCs (CHG) described above and a discovery process are carried out in parallel. In this instance, the EXPs 00 and 01 may select CMs 3 of a transfer destination of the BCs (CHG) in orders different from each other based on the connection configuration information. This can prevent one CM 3 from carrying out a discovery process for the first and second series at the same time and can suppress a processing delay of the CM 3 and so forth.

It is to be noted that a program (processing program) for implementing the functions as the notification section 40a, monitoring section 40b, notification controlling section 40c and resetting section 40d is provided in the form in which it is recorded on a computer-readable recording medium such as, for example, a flexible disk, a CD (CD-ROM, CD-R, CD-RW or the like), a DVD (DVD-ROM, DVD-RAM, DVD-R, DVD+R, DVD-RW, DVD+RW, HD DVD or the like), a blu-ray disk, a magnetic disk, an optical disk, or a magneto-optical disk. Thus, a computer reads out the program from the recording medium and transfers and stores the program to and into an internal storage device or an external storage device and then use the program. Further, the program may be recorded on a storage device (recording medium) such as, for example, a magnetic disk, an optical disk or a magneto-optical disk such that the program is provided from the storage device to the computer through a communication line.

In order to implement the functions as the notification section 40a, monitoring section 40b, notification controlling section 40c and resetting section 40d, the program stored in an internal storage device (in the present embodiment, the ROM not illustrated or the memory 43) is executed by a microprocessor (in the present embodiment, by the processor 42) of the computer. At this time, the program recorded on the recording medium may be read out and executed by the computer.

It is to be noted that the computer in the present embodiment conceptually includes hardware and an operating system and signifies hardware that operates under the control of the operating system. Further, when the operating system is unnecessary and the hardware is operated solely by an application program, the hardware itself corresponds to the computer. The hardware includes at least a microprocessor such as a CPU and means for reading a computer program recorded on a recording medium, and, in the present embodiment, the EXPs 4 have a function as the computer.

With the disclosed technology, when a notification indicating occurrence of a state variation of a storage section is issued to a plurality of controllers through the connection apparatus, the processing load to the connection apparatus that is arised in response to the notification can be reduced.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A connection apparatus interposed between a storage device including at least one storage section and a plurality of controllers for controlling the storage device, the connection apparatus comprising:
   a processor; and wherein
   the processor
   transfers, when a notification indicating occurrence of a state variation relating to the storage section is received from the storage device, the notification to at least one of the controllers,
   monitors access from the at least one of the controllers, to which the notification has been transferred, to the storage device through the connection apparatus, and
   changes over, when it is detected by the monitoring that the access has been terminated, a transfer destination of the notification to one or more of the controllers to which the notification has not been transferred.

2. The connection apparatus according to claim 1, wherein the processor monitors, in the monitoring, controlling information issued from the controller to which the notification has been transferred to the storage device for controlling the storage device in response to the occurrence of a state variation or response information to the controlling information issued from the storage device to the controller or any combination thereof, and detects that the access has been terminated when the issuance of the monitored controlling information or response information or any combination thereof is terminated.

3. The connection apparatus according to claim 1, wherein the processor carries out the changeover until the transfer of the notification is carried out to all of the controllers.

4. The connection apparatus according to claim 3, further comprising:
   a retention section that retains information included in the notification issued from the storage device and indicating the occurrence of a state variation; and wherein the processor
   transfers, in the notification, the notification based on the information retained in the retention section and indicating the occurrence of a state variation to the controller that is the transfer destination, and
   discards, when the transfer of the notification is carried out to all of the controllers in the changeover of the transfer destination of the notification, the information indicating the occurrence of a state variation retained by the retention section.

5. The connection apparatus according to claim 1, wherein a plurality of storage devices each including at least one storage section are directly connected to the connection apparatus or cascade-connected to that one of the storage devices which is directly connected to the connection apparatus; and
   the processor detects that the access has been terminated when the access from the controller to which the notification has been transferred to the last one of the storage devices is terminated in the monitoring.

6. The connection apparatus according to claim 5, wherein, when the connection apparatus receives a notification indicating occurrence of a state variation relating to the storage section from the storage device, the connection apparatus acquires, from the storage devices connected to the connection apparatus, state information of the storage devices, and
   the processor transfers the notification to at least one of the controllers when the processor acquires the state information from all of the storage devices in the notification.

7. The connection apparatus according to claim 5, wherein, when the connection apparatus receives a request for connection information from the controller, to which the notification has been transferred, prior to access to the storage devices, the connection apparatus transmits connection information to the controller, and
   the processor detects, in the monitoring, the last storage device based on the connection information transmitted thereto.

8. The connection apparatus according to claim 1, wherein, when the processor receives a different notification indicating occurrence of a state variation relating to the storage section from the storage device, the processor resets the processing relating to the former notification in the notification, monitoring and changeover of the transfer destination of the notification, and
   transfers, after the resetting, the different notification to at least one of the controllers.

9. The connection apparatus according to claim 1, wherein the processor
   selects, in the notification, at least one of the controllers, to which the notification is to be transferred, based on connection configuration information set in advance, and
   selects, in the changeover of the transfer destination of the notification, one or more of the controllers of the transfer destination in accordance with a predetermined order based on the connection configuration information.

10. The connection apparatus according to claim 1, wherein the processor
    transfers, in the notification, the notification to one of the controllers, and
    changes over, when it is detected by the monitoring that the access has been terminated, in the changeover of the transfer destination of the notification, the transfer destination of the notification to a different one of the controllers to which the notification has not been transferred.

11. A processing method for a connection apparatus interposed between a storage device including at least one storage section and a plurality of controllers for controlling the storage device, the processing method comprising:
- transferring, by a processor, when a notification indicating occurrence of a state variation relating to the storage section is received from the storage device, the notification to at least one of the controllers;
- monitoring, by the processor, access from the at least one of the controllers, to which the notification has been transferred, to the storage device through the connection apparatus; and
- changing over, by the processor, when it is detected by the monitoring that the access has been terminated, a transfer destination of the notification to one or more of the controllers to which the notification has not been transferred.

12. The processing method according to claim 11, wherein the monitoring of the access is carried out by monitoring controlling information issued from the controller to which the notification has been transferred to the storage device for controlling the storage device in response to the occurrence of a state variation or response information to the controlling information issued from the storage device to the controller or any combination thereof, and
- detecting that the access has been terminated when the issuance of the monitored controlling information or response information or any combination thereof is terminated.

13. The processing method according to claim 11, wherein the transfer destination of the notification is changed over until the transfer of the notification is carried out to all of the controllers.

14. The processing method according to claim 11, wherein a plurality of storage devices each including at least one storage section are directly connected to the connection apparatus or cascade-connected to a storage device directly connected to the connection apparatus, and
- detecting that the access has been terminated when the access from the controller, to which the notification has been transferred, to the last one of the storage devices is terminated in the monitoring.

15. The processing method according to claim 11, wherein, when a different notification indicating occurrence of a state variation relating to the storage section is received from the storage device, resetting, by the processor, the processing of the transfer of the notification relating to the former notification, monitoring of the access and changeover of the transfer destination of the notification, and
- transferring, by the processor, the different notification to at least one of the controllers after the resetting.

16. A computer-readable recording medium having stored therein a program for causing a computer interposed between a storage device including at least one storage section and a plurality of controllers for controlling the storage device, to execute a process comprising:
- transferring, when a notification indicating occurrence of a state variation relating to the storage section is received from the storage device, the notification to at least one of the controllers;
- monitoring access from the at least one of the controllers, to which the notification has been transferred, to the storage device through the computer; and
- changing over, when it is detected by the monitoring that the access has been terminated, a transfer destination of the notification to one or more of the controllers to which the notification has not been transferred.

\* \* \* \* \*